United States Patent [19]

Andrews et al.

[11] Patent Number: 4,591,103
[45] Date of Patent: May 27, 1986

[54] ASBESTOS PROCESS

[75] Inventors: John R. Andrews, Glen Waverley; Philip S. B. Stewart, Beaumaris; George T. Hurst, Newport, all of Australia

[73] Assignees: ICI Australia Limited, Victoria; Woods Reef Mines Ltd., New South Wales, both of Australia

[21] Appl. No.: 584,946
[22] PCT Filed: May 13, 1983
[86] PCT No.: PCT/AU83/00061
  § 371 Date: Jan. 25, 1984
  § 102(e) Date: Jan. 25, 1984
[87] PCT Pub. No.: WO83/04190
  PCT Pub. Date: Dec. 8, 1983

[30] Foreign Application Priority Data

May 25, 1982 [AU] Australia .............................. PF4138

[51] Int. Cl.⁴ ............................................. B02C 19/12
[52] U.S. Cl. .......................................... 241/4; 162/3; 241/21; 241/24
[58] Field of Search .................. 241/21, 24, 29, 4, 14, 241/80, 97; 162/3; 209/5

[56] References Cited

U.S. PATENT DOCUMENTS

| 2,474,314 | 6/1949 | Koehne | 241/4 |
| 2,568,023 | 9/1951 | Perry | 241/4 X |
| 2,702,162 | 2/1955 | Lillis et al. | 241/14 |
| 3,493,108 | 2/1970 | Martinez | 241/4 X |
| 3,580,537 | 5/1971 | Andreas | 241/4 |
| 3,727,849 | 4/1973 | Kjos et al. | 241/4 |
| 4,226,672 | 10/1980 | Absolon et al. | 241/21 |

Primary Examiner—Mark Rosenbaum
Attorney, Agent, or Firm—Cushman, Darby & Cushman

[57] ABSTRACT

A process of recovering asbestos fibre from asbestos-bearing material comprising a first stage of preparing a fibre concentrate by the steps of comminution, classification and spiral concentration and a second stage of liberating and recovering fibre, wherein in the second stage there is a separation by means of a hydrocyclone into a well-opened fraction and a poorly opened fraction, and wherein the asbestos-bearing material is substantially moist throughout the process.

16 Claims, 1 Drawing Figure

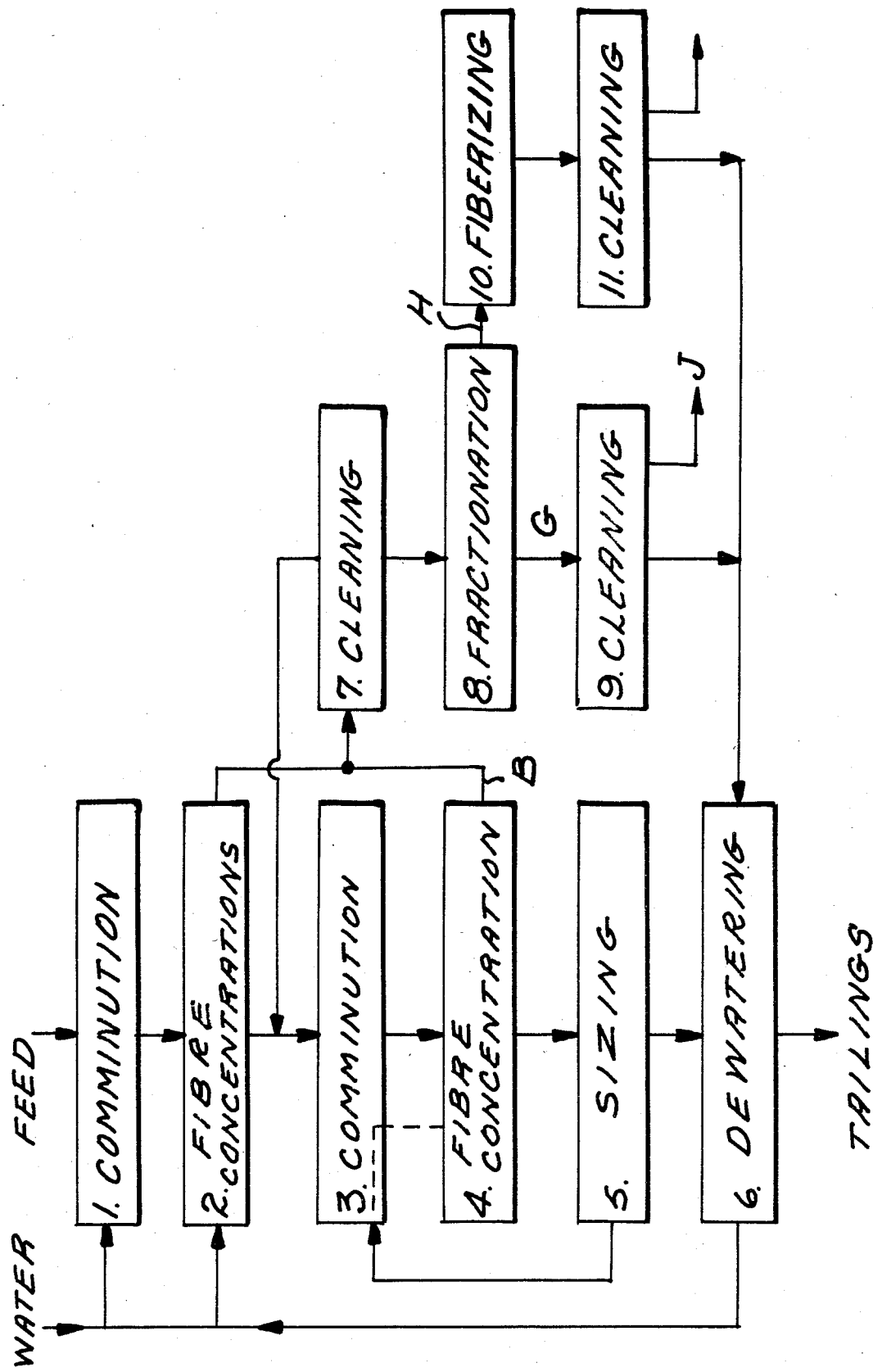

ASBESTOS PROCESS

TECHNICAL FIELD

This invention relates to processes for recovering asbestos fibre from asbestos-bearing materials. In particular it relates to wet processes for treating asbestos-bearing materials.

BACKGROUND ART

The commercial recovery of chrysotile from its ores is typically carried out in a plant in which the asbestos fibre is separated from its host rock by means of a pneumatic system. A complex plant is required, in which a complex sequence of stages of comminution and fibre removal is employed. Despite this, the extraction of the fibre content of some ores is inefficient and a considerable amount of fibre may be left in the tailings from the process. In addition since the longer fibre grades command a premium price, there is frequently considerable loss of product value by the breaking of long fibres into short fibres during the comminution stages.

It is usually necessary to dry the ore feed to the conventional pneumatic process. The drying operation and subsequent process steps are potential sources of release to the environment of chrysotile-containing dust, with its associated health risks. The statutory authorities charged with safeguarding community health in various countries have established maximum allowable concentrations of respirable asbestos fibres in the atmospheres in which people are required to work. These concentrations limits have been made progressively more stringent in recent years and consequently it is becoming more difficult for dry extraction plants to comply with them.

A means of reducing the possibility of emission of asbestos dusts to the atmosphere is to carry out the various operations in an aquoues medium instead of in air. However, it has not proved feasible, hitherto, to devise a wet process having the efficiency, economy and general applicability required for commercial development.

A wet process for separating asbestos from its ores, for example, has been disclosed in U.S. Pat. No. 4,226,672. This process involves the use of an aqueous medium containing a chemical reagent as an aid in the fiberizing step and to improve the quality of the product fibre. In addition to providing a less dusty and hence less hazardous working environment, and an improved yield compared to conventional dry process, the process of U.S. Pat. No. 4,226,672 can provide a fibre of particular reinforcing value in the manufacture of asbestos cement products, such as asbestos cement sheet. This process, however, has higher costs associated with the use of the chemical agent and in the removal of chemical agent from process liquors for recycling in the process.

Thus it is an object of our invention to provide a wet process for recovering asbestos fibres from a wide range of asbestos-bearing materials, for example, crude ore, mill feed, selected streams from conventional processes, tailing, mine wastes and low grade short fibre.

DISCLOSURE OF INVENTION

We have now found a wet process for recovering asbestos fibres from asbestos-bearing materials that allows the said materials to be maintained in a substantially moist condition throughout the processing, and provides yields of fibre at least equal to, and typically substantially greater than, those obtain by the application of conventional dry process to the same asbestos-bearing materials. It is a particular feature of our process that it may be applied to intractable asbestos-bearing materials that cannot be satisfactorily treated by the conventional dry process.

Accordingly we provide a wet process for the recovery of asbestos fibre from asbestos-bearing material which process comprises a first stage of preparing a fibre concentrate by the steps of comminution, classification and concentration and a second stage of liberating and recovering fibre, characterized in that in the first stage, concentration is by means of spiral classifiers, and that in the second stage there is a separation by means of a hydrocyclone of less than 150 mm cross section into a well-opened fraction and a poorly opened fraction, and wherein the separated fibre is recovered on a screen.

Preferably the screen is of the sieve-bend type. In a more preferred embodiment the underflow is subjected to further comminution, typically in a rodmill, and again treated with a hydrocyclone.

The use of spiral classifiers and hydrocyclones has found little application in the commercial processing of asbestos-bearing materials and therefore it is surprising that this particular combination provides not only a viable wet process but in most cases a substantial increase in yield. Reference to yield here is to the composite value of the product derived from the actual yield weight and quality grade of fibre.

BEST MODE OF CARRYING OUT THE INVENTION

An important commercial objective for processing of asbestos ores is the maximization of the value of the product fibre which can be economically extracted. The nature of asbestos ores varies widely, particularly with respect to the preparation and characteristics of the chrysotile component. The method of our invention offers the technical flexibility for dealing economically with such variations. An important advantage of the present invention is its capability for recovering valuable fibre from the tailings discarded from conventional dry milling operations. The typical general flow diagram for the process of our invention is given in FIG. 1 and our process will now be discussed with reference to this diagram but it is not intended that our invention be limited to this particular flow diagram.

Before the chrysotile fibre can be concentrated from an asbestos ore it must be adequately detached from the host rock. This can be achieved by controlled comminution. In order to minimize the degradation of potentially good quality fibre by excessive exposure to crushing and grinding devices, it is an important aspect of our process that the liberated fibre is separated from the bulk of the rock stream at the earliest opportunity in the treatment scheme.

The comminution is achieved in a sequence of a main stage (1) applied to the bulk of the crude ore and a subsequent stage (3).

Each comminution stage employs a crushing or grinding device appropriate to the particle size range required and which can accept a solid feed which is at least wet but may be in the form of a slurry. In addition to the detachment of fibre from rock, some opening of fibre bundles is effected which assists the subsequent hydraulic separation operations. The selection of the types of crushing and grinding equipment which can be used for achieving size reduction below any particular particle size limits involves both economic and technical constraints.

Crushers of impact or compression types can be used to reduce the particle size of the feed material to below about 10–15 mm. The primary crushing of the wet solid can be effected using a jaw crusher, for example. The secondary crushing, optionally with the addition of further water with the solids, can be carried out by means of a cone crusher, for example.

At this first stage (1) of comminution our process provides for removal of the fibre (2) which has been substantially liberated from rock, producing a first crude fibre concentrate. We use for the separation of this concentrate a mechanical classifier (2) such as a screw classifier. This crude fibre concentrate (A) is further enriched by presenting it to a concentrating device (7), preferably a spiral concentrator.

Alternatively, where there is a relatively high concentration of good quality fibre in the feed material, the separation of the first crude fibre concentrate can with advantage be carried out using a large, preferably greater than 150 mm, low-pressure hydrocyclone instead of the classifier at (2). This produces an overflow stream containing fibre comparatively free of rock particles larger than the cut point of the hydrocyclone. For a $d_{95}$ cut point of 25 microns, for example, the fibre will be comparatively free of rock particles with a longest dimension greater than about 30 microns. By a particular $d_{95}$ cut point we mean the size at which 95% of particles of that size in the feed report to the underflow can be given a scavenging treatment to recover further fibre using a spiral concentrator, the fibre accumlating in the light fraction. The heavy or gangue solids presented to the spiral concentrators are preferably smaller than 1.5 mm in their longest dimension for efficient operation.

The stream remaining after removal of the crude fibre concentrate (A) is subjected to further stages of comminution (3), using grinding mills in which the grinding medium may be rods, balls, slugs, or pebbles, to reduce the particle size of the heavy fraction (rock stream) from the mechanical classifier and prepare it for presentation to the concentrating device (4), preferably a spiral concentrator. The heavy (rock) fraction from this spiral concentrator can be given a further scavenging treatment. The rock stream is presented to a screen (5), preferably a sieve bend, having an aperture of about 300 microns. The oversize (D) from this screen is passed again through a ball mill (3) and then passed over another spiral concentrator to produce a further fibre concentrate which is combined with the previously fibre concentrate (B) and submitted to a cleaning operation (7).

The undersize from the screen or sieve bend (5) comprises mainly rock particles (E) typically of a size which it is considered not economically useful to grind further. The small amounts of short fibre and composite particles present are removed from this fine rock stream before it is discarded from the system, by passing over another spiral concentrator. The rock tailings slurry is sent to a thickener (6) from which the clarified water may be re-used in the circuit.

By selection of a suitable section profile for the spiral concentrators the incoming solids can be separated into three fractions. The more open fibre is included in a light fraction, the less open or spicular fibre is included in a middlings fraction, which may be worth some further treatment to release more open fibre, and the substantially non-fibrous solids reports to a heavy fraction. Spiral concentrators have been found to be particularly suitable for rejecting essentially barren rock particles or grit (larger than about 200 mesh) from the treatment circuit. It will be understood that where one spiral concentrator is referred to, it may be necessary in practice to effect multiple passes of selected process streams through several spiral concentrators in series, in order to ensure that the required efficiency of fibre recovery is attained. Different section profiles can be selected for best effect with different rock size ranges.

The crude fibre concentrates (A), (B), from which the grit has been removed in spiral concentrators, are further upgraded by passing through large (preferably greater than 150 mm), low-pressure hydrocyclones (7) which largely eliminate into the underflow (F) the rock particles larger than the cut point of the hydrocyclones (typically about 30 micron).

The cleaned fibre concentrate from the large hydrocyclone overflow is fractionated into a well-opened fraction (B) and a poorly-opened or spicular fraction (H) by passing through small (typically 50 mm), high pressure hydrocyclones (8). The resulting well-opened fibre fraction is presented to a fine screen (9), typically with a 100 micron opening, the undersize from which is valueless fine gangue, the oversize being a substantially dewatered fibre product of commercial quality (product J). The fine screen is preferably a sieve bend; a unit which is pressure fed and rapped periodically is especially effective.

The underflow (H) from the small hydrocyclone comprises substantially unopened fibre particles, pencils, spicules and the like. For some ores this fraction can represent a major proportion of the total fibre content, consequently, it is important to optimize its quality. This is achieved by fiberizing or opening the fibre bundles in a suitable fiberizing device (10), such as a rod or ball mill or a rotating disc type of colloid mill. Again the fiberized product is passed through a small high pressure hydrocyclone, to eliminate in the underflow any unopened fibre particles for reprocessing. The overflow is again cleaned by presenting it to a fine screen (11), which effects the removal of fine gangue as well as substantial dewatering of the fibre Product K.

Optionally, the unopened fibre fraction from the small hydrocyclone can be fiberized with the assistance of added chemical reagents. By the application of the chemical fiberizing treatment described in U.S. Pat. No. 4,226,672, for example this fiber can be upgraded to form a fibre product, with a high reinforcing value in asbestos cement. The selective chemical treatment of the unopened fibre fraction, and the optional subsequent blending of this product with the previously separated opened fibre fraction, allows the impact of the cost of the chemical treatment to be minimized by the capability of this method to eliminate fine rock particles from the fibre, since these unnecessarily consume chemical in the process of U.S. Pat. No. 4,226,672.

Thus, in a further embodiment of the invention, the poorly-opened fibre fraction is further opened in a suitable fiberizing device with the aid of a chemical fiberizing reagent.

The partially dewatered product (J, K) is preferably further dewatered for use and economy of storage and transport. This can be effected by subjecting the partially dewatered product (J, K) to pressure. The equipment used for applying the pressure can be chosen in accordance with the final physical form required for the product. For example, pressure may be applied in a briquetting machine. Alternatively, the preliminary dewatering can be effected in equipment such as is used for forming asbestos paper or board and the sheets of wet fibre from these units further dewatered as required by subjecting to suitable pressures, for example by passing between compaction rolls.

Whereas conventional pressure filters or centrifuges typically do not reduce the moisture content of the product fibre much below 40% by weight, it is possible to achieve moisture levels down to about 17% by weight of application of pressures in the range illustrated by Examples 6 to 10. It is essential that all of the fibre should remain wet at all times in order to avoid the possible generation of airborne dust. This would not be the case with other commercially practicable and economic methods for lowering the water content, such as those involving the application of heat or passage of gases, in which it would be difficult to avoid making some part of the fibre too dry.

Thus in a further embodiment of the process of our invention we provide a process of dewatering wet asbestos fibres by filtration under high pressures. Typical suitable apparatus for this high pressure filtration includes, for example screw presses and V-presses. A particular advantage of these presses is that the dewatered asbestos is recovered in the form of pellets which may be conveniently packed and shipped.

We have further found that the wet asbestos fibres can be effectively dewatered by an electrokinetic technique.

INDUSTRIAL APPLICABILITY

It is a particular feature of the process of our invention that it provides a means of recovering asbestos fibre from asbestos-containing material that is relatively free of the dust hazards associated with the conventional. Furthermore the yields obtained by our process from a given crude ore are substantially greater than those obtained from the conventional dry process from comparable samples of the same ore. In the case of intractible ores that are difficult to treat by the dry process the increase in yield value has been as great as 100%, since the wet process minimizes both the loss of fibre through crushing to fine fragments and dust, and more generally, by reducing the loss of fibre value through breakage of long high value fibre.

The asbestos fibres produced by our process may be used in all the conventional asbestos fibre applications. In particular the dewatered product containing 17–18% by weight of water, and whether in the form of pellets, briquettes or "paper rolls" is in a convenient form for making cementitious compositions, such as for example, asbestos cement articles. The product readily disintegrates when immersed in water and is then easily redispersed as required.

The invention is now illustrated by, but not limited to, the following examples. All parts and percentages are on a weight basis unless otherwise stated.

EXAMPLE 1

Stage 1.
Approximately 300 kg of crushed ore from Woodsreef mine (passing 16 mesh) was treated in a semicontinuous demonstration unit according to the general flow diagram of FIG. 1.

The ore was fed at 2–3 kg/min into a sump where it was mixed with water and the slurry pumped to the rough fibre concentration Stage 2.

The operations carried out and the key items of equipment used for each stage of the process are described below.

Stage 2. First rough concentration of fibre

The primary separation of fibre and rock particles was effected in a 150 mm hydrocyclone. A spiral concentrator was used to scavenge further crude fibre from the 150 mm hydrocyclone underflow (rock stream).

Stage 3. Comminution

Further liberation of fibre from rock and opening of fibre bundles was carried out by subjecting the spiral tails from Stage 2 to grinding in a rod mill.

Stage 4. Second rough concentration of fibre

After grinding, a further crude fibre concentrate was separated from the substantially rock stream in a spiral concentrator. The configuration of this spiral concentrator allowed the separation of a middlings fraction as well as a tailing fraction. The middling fraction was recycled.

Stage 5. Sizing

The rock tailing stream from the spiral concentrator of Stage 4 was presented to a weir-fed 45° sieve bend of 100 micron aperture, the oversize from which was recycled to receive further comminution in Stage 3.

Stage 6. Waste dewatering

The undersize stream from Stage 5 was passed to a lamellar thickener in which the fine gangue was separated from the bulk of the water for rejection as thickened waste. The water was recycled to the initial operations in the process.

Stage 7. Cleaning fibre concentrates

The rough fibre concentrates from the spiral concentrators in Stage 2 and 4 were cleaned by passing through a 150 mm hydrocyclone. The grit separated in the underflow was re-treated to extract residual fibre, as in Stages 3 and 4, by passing through a ball mill and then over spiral concentrators.

Stage 8. Fibre fractionation

The fibre rich stream produced as the overflow from the 150 mm hydrocyclone (Stage 7) was fractionated, to separate the well-opened fibre from the poorly-opened fibre, by passing through a small (50 mm) hydrocyclone. The poorly opened fraction was upgraded by removing grit in spiral concentrators, the concentrate from which represented an intermediate fibre product requiring further opening to attain its optimum value for reinforcing cement. The tailings fraction from these spiral concentrators was retreated as in Stages 3, 4 and 5 to extract any remaining useful fibre.

In order to ensure the high cement reinforcing value sought in this experiment, the poorly-opened fibre fraction was further enriched by retreatment through spiral concentrators to eliminate residual grit, and sieve bends to remove fine gangue.

Stage 9. Fibre Cleaning

The opened fibre in the small cyclone overflows from Stage 8 was further upgraded by presentation to a series of screens to remove valueless fines. The stream from Stage 8 was first presented to pressure-fed 120° sieve bends (200 microns) which retained the fibre product. The water stream which passed through these screens was presented to 45° weir-fed sieve bends (100 microns) to scavenge residual fibre before recycle. The fine gangue in the water stream passing this screen was removed from the system by passing through a lamellar thickener (Stage 6). The opened fibre product was retreated by passing through small hydrocyclones and sieve bends essentially as done in Stages 8 and 9. This yielded the product J (Table 1).

Stage 10. Fibre opening

The poorly-opened intermediate fibre product from Stage 8 was subjected to a fiberizing treatment, with the aid of a chemical fiberizing reagent, Matexil WA-OT, following the process of U.S. Pat. No. 4,226,672.

Well opened fibre was separated from residual poorly opened fibre by passing through 50 mm hydrocyclones, the latter component being recycled for further treatment.

Stage 11. Fibre cleaning

The opened-fibre fraction from Stage 10 was cleaned by presentation to pressure fed, 120° sieve bends (200 micron aperture) to eliminate fine gangue. The retained fibre was the product K (Table 1).

The products J and K were mixed by re-slurrying and dewatering to give a single blended product from this experiment (Table 1).

The results of measurements made on each of the products from each stage are recorded in Table 1. These results include the yield of each extracted product as a percentage by weight on the feed ore, the modulus of rupture (MRA) for plaques containing 12.5% of fibre, the Bauer-McNett sizing (top and bottom fractions only shown), and a specific surface area (SSA) measured by a water permeability test.

TABLE 1

| Fibre Product | Yield % | MRA kg/cm$^2$ | Sizing (%) +14 mesh | Sizing (%) −325 mesh | SSA Cm$^2$/g fibre |
|---|---|---|---|---|---|
| Well-opened product (J) | 1.4 | 443 | 40 | 9 | 33 000 |
| Poorly-opened intermediate | 2.3 | 284 | 2 | 8 | 9 000 |
| Chemically fiberized product (K) | 1.9 | 340 | 76 | 9 | 48 000 |
| Blended product | 3.3 | 407 | 63 | 7 | 35 000 |

A matched sample of the same feed material was processed in the core laboratory at the source of the ore. The standard evaluation of the data showed that the monetary value of fibre extracted by the wet process was just over twice the value of the fibre extracted by the dry process.

EXAMPLE 2

A sample of 700 kg of a Canadian chrysotile ore (precrushed to pass 16 mesh) was treated using the equipment described in Example 1 and a similar circuit. The yield of blended fibre product was 6.8% and it gave a modulus of rupture (MRA) for plaques containing 12½% fibre, of 320 kg/cm$^2$.

A matched sample of this feed material was processed in the same core laboratory (dry process) as for Example 1. The yield was 5.3% of a fibre product having a lower reinforcing value than the product from the wet process.

EXAMPLE 3

A sample of 400 kg of tailings from the conventional dry milling of the Canadian chrysotile ore used for Example 2 was treated using the equipment described in Example 1 and a similar circuit. The yield of blended fibre product was 8.3% and the fibre had a modulus of rupture (MRA) for plaques containing 12½% fibre, of 308 kg/cm$^2$.

A matched sample of this feed material was processed in the same core laboratory (dry process) as for Example 1. The yield was 2.4% of a fibre product having reinforcing value slightly lower than the product from the wet process.

EXAMPLES 4 AND 5

A sample of the poorly-opened intermediate fibre of Example 1 (20 kg of contained fibre) was subjected to fiberizing by wet mechanical means instead of by the addition of chemical reagent used for Example 1. As in Example 1 (Stages 10 and 11) the circuit was closed through a 50 mm hydrocyclone and the opened fibre was cleaned over a sieve bend (300 micron aperture).

Two fiberizing devices were compared; a rotating disc type colloid mill and a rod mill. Measurements made on the fibre product, as for Example 1, are recorded in Table 2.

TABLE 2

| Example No | Fiberizing device | MRA (12½%) kg/cm$^2$ | Sizing % +14 mesh | Sizing % −325 mesh |
|---|---|---|---|---|
| 4 | Disc mill | 376 | 11 | 4 |
| 5 | Rod mill | 413 | 5 | 14 |

EXAMPLE 6

A mechanical press was used to demonstrate the removal of water from wet fibre by the application of pressure. The press comprised a metal piston fitting closely inside a metal ring, approximately 4 cm high and 2 cm internal diameter. The ring was clamped to a metal base plate with a sheet of 200 mesh wire screen held between the two parts. The specimen of wet fibre was confined in the ring between the piston and the metal base plate.

A sample of wet fibre (10.4 g)—the product J of Example 1—containing 82% by weight of water was confined in the press and the piston was loaded to subject the fibre to a pressure of 6.4 MPa. Essentially clear water exuded between the ring and the base plate. The water content of the resulting cake of fibre was 30% by weight. On immersion in water the cake began to break up and was then readily dispersed by stirring.

EXAMPLES 7-10

Four samples of a wet fibre, similar to the product J of Example 1, were subjected to a series of pressures in a mechanical press, as described in Example 6. The residual water contents of the compressed cakes are recorded in Table 3.

TABLE 3

| Example No | Applied Pressure MPa | Water Content % weight |
|---|---|---|
| 7 | 3 | 30 |
| 8 | 14 | 24 |
| 9 | 21 | 20 |
| 10 | 34.5 | 16.8 |

The compressed cake of Example 10 was immersed in water. It expanded to about twice its volume and began to break up, after which it could be dispersed by stirring.

EXAMPLE 11

The process was applied essentially as described to 5 samples of ore at the Woodsreef Mine (Barraba, New South Wales) during the period January to April 1982. Each sample was also treated with the core laboratory dry process. Table 4 records the dry weight of ore, weight and yield (%) of product by both the wet and dry process, the mean FSU (fibre strength units for an MRA of 275), and the effective wet/dry yield ratio.

TABLE 4

| Period (Samples) | Dry ore (tonnes) | Wet Process Yield % | Wet Process Mean FSU | Dry Core Lab. Process Yield % | Dry Core Lab. Process Mean FSU | Effective Ratio* Wet/Dry |
|---|---|---|---|---|---|---|
| 1 (1–9) | 19.1 | 5.26 | 62 | 2.72 | 68 | 1.74 |
| 2 (10–20) | 64.5 | 3.13 | 93 | 2.63 | 87 | 1.27 |
| 3 (21–25) | 52.9 | 3.64 | 86 | 2.67 | 80 | 1.47 |
| 4 (26–30) | 70.2 | 3.10 | 83 | 2.38 | 74 | 1.46 |
| 5 (31–35) | 22.7 | 3.40 | 92 | 2.81 | 75 | 1.50 |
| 6 (36–38) | 27.1 | 3.28 | 102 | 2.64 | 74 | 1.71 |

*Ratio = $\dfrac{\text{Wet Yield} \times \text{Wet FSU}}{\text{Dry Yield} \times \text{Dry FSU}}$ Individual yields on samples for the wet process ranged from 4.2–7.9% w/w, and for the dry process, 2.5–3.4% w/w. The yields from the wet process are for dried product fibre.

EXAMPLE 12

A similar comparison to that of Example 11 was made for the period July to September 1982, except that in the data recorded in Table 5 the individual samples have been grouped by blasts (and hence particular ore locations) as well as chronological sequence.

TABLE 5

| Blast | Data | Tonnes | Wet Process Yield % | Wet Process Mean FSU | Dry Core Lab. Process Yield % | Dry Core Lab. Process Mean FSU | Effective Ratio Wet/Dry |
|---|---|---|---|---|---|---|---|
| 131 | Jul 8–12 | 12.6 | 3.35 | 118 | 2.89 | 80 | 1.71 |
| 84 | Aug 3–9 | 25.0 | 4.46 | 80 | 2.12 | 90 | 1.87 |
| 84 | Sept 7–9 | 26.2 | 4.56 | 81 | 2.28 | 85 | 1.91 |
| 151 | Sept 10–16 | 19.6 | 6.78 | 78 | 2.73 | 88 | 2.20 |
| 131 | Sept 16–22 | 31.4 | 5.01 | 77 | 2.01 | 93 | 2.06 |

The average effective wet/dry ratio was 1.90.

EXAMPLE 13

Table 6 records a comparison of the wet process of our invention with both the dry core laboratory process and the commercial dry mill process for several batches of ore from the Woodsreef Mine.

TABLE 6

| | Equivalent yield for an FSU of 85 | | |
|---|---|---|---|
| Blast | Wet Process | Core Lab | Dry Mill |
| 94 | 3.07 | 2.28 | 2.63 |
| 113 | 4.00 | 2.23 | 2.40 |
| 129/130 | 3.50 | 2.38 | 3.01 |
| 149/151 | 6.19 | 2.81 | 3.77 |
| 156 | 4.38 | 2.41 | 3.22 |

EXAMPLE 14

Samples of waste tailings from the Woodsreef dry mill were subjected to the wet process of our invention. The yields varied considerably as is shown in Table 7, but in general up to 2% w/w yield (equivalent FSU 85 grade) can be obtained from tailings that would otherwise be discarded.

TABLE 7

| Origin | Tonnes | % Yield | FSU | Calculated Yield equiv for FSU = 85 |
|---|---|---|---|---|
| MT (May 20–21) | 12.4 | 1.51 | 72 | 0.98 |
| WMT (May 26–27) | 14.4 | 0.85 | 105 | 1.05 |
| OT 4 (Jul 6–8) | 9.4 | 2.14 | 77 | 2.10 |
| OT 6 (Oct 22–25) | 17.9 | 2.26 | 71 | 2.03 |
| OT 3 (Aug 10–25) | 38.3 | 4.74 | 65 | 2.97 |
| OT 7 (Aug 26–Sept 3) | 47.6 | 3.56 | 73 | 2.01 |
| OT 8 (Sept 23–27) | 13.9 | 2.64 | 91 | 1.95 |

EXAMPLE 15

Samples of wet asbestos fibres from the process of our invention were dewatered in a RVP-36 disc drier. At 0.6 rpm and at the maximum operating cylinder pressure of 2500 psi a 58% w/w solids output was obtained from a 39.5% w/w solids input. The effluent contained 0.0075% w/w solids. The throughput was 18.5 MT/D. With a speed of 1.5 rpm the output fell to 53.4% w/w solids but the rate increased to 33 MT/D.

We claim:

1. A wet process for the recovery of asbestos fibre from asbestos-bearing material which process comprises preparing a fibre concentrate by comminuting said asbestos-bearing material in the presence of water thereby forming a slurry, separating the fibre by means of at least one mechanical classifier and at least one spiral separator, and concentrating the fibre using at least one hydrocyclone of at least 150 mm diameter; fractionating said fibre concentrate into a well-opened fibre fraction and a poorly opened fibre fraction by means of at least one hydrocyclone of diameter less than 150 mm; and collecting the well-opened fibre fraction on a screen.

2. A wet process for the recovery of asbestos fibre from asbestos-bearing material which process comprises preparing a fibre concentrate by comminuting said asbestos-bearing material in the presence of water thereby forming a slurry, separating the fibre by means of at least one hydrocyclone of at least 150 mm diameter and at least one spiral separator, and concentrating the fibre using at least one hydrocyclone of at least 150 mm diameter; fractionating said fibre concentrate into a well-opened fibre fraction and a poorly opened fibre fraction by means of at least one hydrocyclone of diameter less than 150 mm; and collecting the well-opened fibre fraction on a screen.

3. A process as in claim 1 or 2 wherein the asbestos-bearing material comprises chrysoltile.

4. A process as in claim 3 wherein the said asbestos-bearing material is selected from the group consisting of crude ore, fibre concentrates from dry and wet processes, mine wastes and tailings, and low grade short fibre.

5. A wet process for the recovery of asbestos fibre from asbestos-bearing material comprising comminuting said asbestos-bearing material; separating said comminuted material into a first crude fibre concentrate and tailings by means of at least one mechanical classifier and at least one spiral separator; comminuting said tailings to liberate further fibre; separating said comminuted tailing into a second crude fibre concentrate and rock tailings using at least one spiral separator; combining said first crude fibre concentrate and said second crude fibre concentrate and further concentrating the combined concentrates to give a fibre concentrate and fibre concentrate tailings by means of at least one hydrocyclone of at least 150 mm diameter; fractionating the fibre concentrate to give a well-opened fibre fraction and a poorly-opened fibre fraction using at least one hydrocyclone of diameter less than 150 mm; collecting the well-opened fibre fraction on a screen; fiberizing the poorly-opened fibre fraction to give a fiberized fraction; concentrating said fiberized fraction to give a cleaned fiberized fraction and residual poorly-opened fibre tailings by means of at least one hydrocyclone of diameter less than 150 mm diameter; and collecting the cleaned fiberized fraction on a screen.

6. A wet process for the recovery of asbestos-fibre from asbestos-bearing material comprising comminuting said asbestos-bearing material; separating said comminuted material into a first crude fibre concentrate and tailings by means of at least one hydrocyclone of at least 150 mm diameter and at least one spiral separator; comminuting said tailings to liberate further fibre; separating said comminuted tailing into a second crude fibre concentrate and rock tailings using at least one spiral separator; combining said first crude fibre concentrate and said second crude fibre concentrate and further concentrating the combined concentrates to give a fibre concentrate and fibre concentrate tailings by means of at least one hydrocyclone of at least 150 mm diameter; fractionating the fibre concentrate to give a well-opened fibre fraction and a poorly-opened fibre fraction using at least one hydrocyclone of diameter less than 150 mm; collecting the well-opened fibre fraction on a screen; fiberizing the poorly-opened fibre fraction to give a fiberized fraction, concentrating said fiberized fraction to give a cleaned fiberized fraction and residual poorly-opened fibre tailings by means of at least one hydrocyclone of diameter less than 150 mm diameter; and collecting the cleaned fiberized fraction on a screen.

7. A process as in claim 5 or 2 wherein the poorly-opened fibre fraction is fiberized in the presence of a chemical fiberizing agent.

8. A process as in claim 5 or 2 wherein the well-opened fraction comprises fibrous material separated from the asbestos-bearing material by comminution with minimal breaking of the fibrils, and the poorly-opened fraction comprises fibrous material that undergoes substantial fibril-breakage on comminution.

9. A process as in claim 8 wherein the screen used to recover liberated fibre has a mesh size of not less than 100 microns.

10. A process as in claim 5 or 2 wherein the means of comminution of the poorly opened fraction comprises a ball mill.

11. A process as in claim 1 or 6 wherein the fibre concentrate tailings are recycled and subjected to further comminution.

12. A process as in claim 11 wherein the recycled tailings additionally comprise the residual poorly-opened fibre tailings.

13. A process as in claim 1 or 6 wherein the screen comprises a sieve bend.

14. A process as in claim 13 wherein the screen used to recover the fiber concentrate has a mesh size of not less than 300 microns.

15. A process as in claim 5 or 6 wherein the means of comminution of the poorly opened fraction comprises a rod mill.

16. A process as in claim 5 or 6 wherein the means of comminution of the poorly opened fraction comprises a rotating-disc type colloid mill.

* * * * *